US010415830B2

(12) United States Patent
Inoue et al.

(10) Patent No.: US 10,415,830 B2
(45) Date of Patent: Sep. 17, 2019

(54) COMBUSTION BURNER, COMBUSTOR, AND GAS TURBINE

(71) Applicant: MITSUBISHI HITACHI POWER SYSTEMS, LTD., Kanagawa (JP)

(72) Inventors: Kei Inoue, Tokyo (JP); Shinji Akamatsu, Yokohama (JP); Naoki Abe, Yokohama (JP); Kenta Taniguchi, Kanagawa (JP); Keijiro Saito, Tokyo (JP); Katsuyoshi Tada, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 365 days.

(21) Appl. No.: 15/511,346

(22) PCT Filed: Aug. 18, 2015

(86) PCT No.: PCT/JP2015/073122
§ 371 (c)(1),
(2) Date: Mar. 15, 2017

(87) PCT Pub. No.: WO2016/042960
PCT Pub. Date: Mar. 24, 2016

(65) Prior Publication Data
US 2017/0292706 A1    Oct. 12, 2017

(30) Foreign Application Priority Data

Sep. 19, 2014   (JP) ................................. 2014-190634

(51) Int. Cl.
*F23R 3/14*    (2006.01)
*F23R 3/28*    (2006.01)
(Continued)

(52) U.S. Cl.
CPC .................. *F23R 3/14* (2013.01); *F02C 3/06* (2013.01); *F02C 7/04* (2013.01); *F02C 7/222* (2013.01);
(Continued)

(58) Field of Classification Search
CPC .... F23R 3/14; F23R 3/002; F23R 3/28; F23C 2900/07001; F23C 7/004; F23D 11/103;
(Continued)

(56) References Cited

U.S. PATENT DOCUMENTS 5,251,447 A * 10/1993 Joshi ......................... F23R 3/14
                                                        239/403
5,351,477 A * 10/1994 Joshi ....................... F23C 7/004
                                                        239/400
(Continued)

FOREIGN PATENT DOCUMENTS

CN          1707163        12/2005
CN         103003552         3/2013
(Continued)

OTHER PUBLICATIONS

Office Action dated Dec. 12, 2017 in corresponding Korean Patent Application No. 10-2017-7005483, with Machine Translation.
(Continued)

*Primary Examiner* — Lorne E Meade
*Assistant Examiner* — Eric W Linderman
(74) *Attorney, Agent, or Firm* — Wenderoth, Lind & Ponack, L.L.P.

(57) ABSTRACT

A combustion burner includes a nozzle, a swirl vane having a fuel injection hole, the swirl vane being disposed in an air flow passage of an annular shape extending along an axial direction of the nozzle around the nozzle, and a partition plate having an annular shape and partitioning at least a region of the air flow passage in a radial direction of the
(Continued)

nozzle, so as to divide at least the region into an inner flow passage facing an outer peripheral surface of the nozzle and an outer flow passage disposed on an outer side of the inner flow passage with respect to the radial direction. The fuel injection hole is disposed in the outer flow passage of the air flow passage. An end portion on an upstream side of the partition plate is disposed upstream of the fuel injection hole in the axial direction.

10 Claims, 8 Drawing Sheets

(51) Int. Cl.
```
F23C 7/00      (2006.01)
F02C 3/06      (2006.01)
F02C 7/04      (2006.01)
F02C 7/22      (2006.01)
F23R 3/00      (2006.01)
```
(52) U.S. Cl.
CPC .............. *F23R 3/002* (2013.01); *F23R 3/28* (2013.01); *F05D 2220/32* (2013.01); *F05D 2240/35* (2013.01); *F05D 2260/14* (2013.01)

(58) Field of Classification Search
CPC .... F02C 3/06; F02C 7/047; F02C 7/04; F02C 7/222
See application file for complete search history.

(56) References Cited

U.S. PATENT DOCUMENTS

| | | | | |
|---|---|---|---|---|
| 5,647,200 | A * | 7/1997 | Althaus | F02K 3/10 60/39.17 |
| 5,827,054 | A | 10/1998 | Sarv et al. | |
| 6,141,967 | A | 11/2000 | Angel et al. | |
| 6,511,312 | B2 * | 1/2003 | Primdahl | F23C 7/004 239/403 |
| 6,901,756 | B2 * | 6/2005 | Gerendas | F23R 3/14 60/740 |
| 6,993,916 | B2 * | 2/2006 | Johnson | F23R 3/14 239/405 |
| 7,360,363 | B2 * | 4/2008 | Mandai | F23R 3/14 60/737 |
| 7,878,001 | B2 * | 2/2011 | Ishizaka | F23R 3/286 431/182 |
| 8,001,786 | B2 * | 8/2011 | Oda | F23R 3/50 60/742 |
| 8,065,880 | B2 * | 11/2011 | Ishizaka | F23R 3/286 60/737 |
| 8,826,666 | B2 * | 9/2014 | Kajimura | F23D 14/24 60/740 |
| 8,938,969 | B2 * | 1/2015 | Yuasa | F23R 3/343 60/740 |
| 9,062,885 | B2 | 6/2015 | Takami et al. | |
| 9,109,553 | B2 * | 8/2015 | Matsuyama | F02M 23/12 |
| 9,638,040 | B2 | 5/2017 | Guemmer | |
| 9,939,155 | B2 * | 4/2018 | Pfeffer | B01F 5/0401 |
| 10,240,791 | B2 * | 3/2019 | Nagai | F23R 3/14 |
| 2003/0014976 | A1 | 1/2003 | Mandai et al. | |
| 2003/0084667 | A1 | 5/2003 | Gerendas et al. | |
| 2004/0020210 | A1 | 2/2004 | Tanaka et al. | |
| 2005/0268618 | A1 | 12/2005 | Johnson et al. | |
| 2007/0199327 | A1 | 8/2007 | Tanimura et al. | |
| 2009/0025395 | A1 * | 1/2009 | Nilsson | F23C 7/004 60/748 |
| 2009/0056336 | A1 * | 3/2009 | Chila | F23R 3/14 60/737 |
| 2009/0139236 | A1 * | 6/2009 | Yilmaz | F23R 3/14 60/737 |
| 2009/0277178 | A1 | 11/2009 | Carroni et al. | |
| 2009/0320485 | A1 * | 12/2009 | Wilbraham | F23R 3/14 60/748 |
| 2010/0020597 | A1 | 1/2010 | Okhonin et al. | |
| 2010/0058767 | A1 | 3/2010 | Simons et al. | |
| 2010/0074757 | A1 | 3/2010 | Headland | |
| 2010/0263381 | A1 | 10/2010 | Ishizaka et al. | |
| 2012/0144832 | A1 * | 6/2012 | Herbon | F02C 3/14 60/737 |
| 2012/0167570 | A1 | 7/2012 | Evulet | |
| 2012/0175430 | A1 | 7/2012 | Bathina et al. | |
| 2012/0180490 | A1 | 7/2012 | Takami et al. | |
| 2012/0247110 | A1 | 10/2012 | Clemen | |
| 2012/0312890 | A1 | 12/2012 | Romig | |
| 2013/0255261 | A1 | 10/2013 | Abdelnabi et al. | |
| 2016/0215982 | A1 | 7/2016 | Pfeffer et al. | |

FOREIGN PATENT DOCUMENTS

| | | |
|---|---|---|
| CN | 103210257 | 7/2013 |
| JP | 6-94218 | 4/1994 |
| JP | 2003-42453 | 2/2003 |
| JP | 2003-083541 | 3/2003 |
| JP | 2005-351616 | 12/2005 |
| JP | 2007-285572 | 11/2007 |
| JP | 2009-133605 | 6/2009 |
| JP | 2010-060275 | 3/2010 |
| JP | 2010-223577 | 10/2010 |
| JP | 2010-249449 | 11/2010 |
| JP | 4719059 | 7/2011 |
| JP | 2012-145077 | 8/2012 |
| JP | 2013-194928 | 9/2013 |
| JP | 5501650 | 5/2014 |
| JP | 2014-101856 | 6/2014 |
| JP | 2015-183960 | 10/2015 |
| JP | 2015-209842 | 11/2015 |

OTHER PUBLICATIONS

U.S. Office Action dated Apr. 27, 2018 in related U.S. Appl. No. 14/897,814.
International Search Report dated Nov. 10, 2015 in International (PCT) Application No. PCT/JP2015/073122.
Decision to Grant a Patent dated Mar. 4, 2016 in Japanese Application No. 2014-192017 (with English translation).
International Search Report dated Apr. 28, 2015 in International (PCT) Application No. PCT/JP2015/051797.
Office Action dated Dec. 11, 2018 in corresponding German Patent Application No. 11 2015 004 264.4 with English translation.
International Preliminary Report on Patentability and Written Opinion of the International Searching Authority dated Mar. 30, 2017 in corresponding International (PCT) Application No. PCT/JP2015/073122, with English Translation.
Notification of Reasons for Refusal dated Jul. 13, 2018 in corresponding Japanese patent Application No. 2014-190634, with English-language translation.

* cited by examiner

AXIAL DIRECTION

COMBUSTION BURNER, COMBUSTOR, AND GAS TURBINE

TECHNICAL FIELD

The present disclosure relates to a combustion burner including a swirler for forming a swirl flow, and a combustor and a gas turbine including the combustion burner.

BACKGROUND ART

Generally, a known combustion burner for producing combustion gas is provided with a swirler for swirling air. For instance, a gas turbine including a compressor, a combustor provided with a combustion burner, and a turbine, is equipped with a pilot burner and a main combustion burner (premixing combustion burner) serving as combustion burners, and a swirler is disposed in an air flow passage of such a combustion burner.

Patent Document 1 discloses a combustion burner provided with a plurality of swirl vanes arranged in a radial fashion in an air passage around a combustion nozzle. Patent Document 1 also discloses a configuration with a partition wall for dividing the air passage into air passages on the inner side and the outer side in the radial direction. With this configuration, a layer of air (film layer) having passed through the air passage on the inner side in the radial direction covers a downstream end portion of the combustion nozzle, and thereby it is possible to suppress a temperature increase of the downstream end portion.

Further, Patent Document 2 discloses a burner including: a partition wall partitioning an air passage region at the inner side from an air passage region at the outer side in the radial direction; and swirl vanes disposed in the air passage region at the outer side in the radial direction. With the above burner, air is not swirled in the air passage region at the inner side in the radial direction, and thereby the axial-flow velocity is increased at the inner side.

CITATION LIST

Patent Literature

Patent Document 1: JP2010-249449A
Patent Document 2: JP2010-223577A

SUMMARY

Problems to be Solved

Meanwhile, for a combustion burner, it is necessary to suppress occurrence of flashback, which is one of the factors of trouble of a burner, such as burn damage to a nozzle and to structures around the nozzle. In general, it is known that flames are likely to flow backward to a region with a low axial velocity and a high fuel density. In other words, flashback is likely to occur in a region where the axial velocity of gas is low, and in a region where the fuel density in gas is high.

In an air flow passage of a combustion burner, the axial velocity is slower in a region formed on the center side of the swirl of a swirl flow formed by a swirler, than around the region. Further, a region with a low axial velocity is formed by a laminar flow formed in the vicinity of the wall surface of the air flow passage. In these regions, there is a higher risk of the propagation speed of flames rising higher than the axial velocity, which may bring about flashback. Furthermore, gas with a high fuel density has a higher ignition performance, which also raises the risk of occurrence of flashback, obviously. Thus, if the axial velocity is low and the fuel density is high in the same region, there is an even higher risk of occurrence of flashback.

In this regard, according to Patent Document 1, a film layer covers a region with a low axial velocity at a boundary layer around a nozzle, and thus it is possible to suppress occurrence of flashback to some extent, in terms of axial velocity. However, fuel injected from injection holes of swirl vanes may enter the film layer, and the risk of occurrence of flashback cannot be eliminated in terms of fuel density.

Moreover, although Patent Document 2 discloses increasing the axial velocity in an air passage region on the inner side in the radial direction to suppress flash back, there is no disclosure of a measure to suppress flashback in terms of fuel density.

In view of the above issues, an object of at least one embodiment of the present invention is to provide a combustion burner, a combustor, and a gas turbine whereby it is possible to suppress occurrence of flashback effectively.

Solution to the Problems

A combustion burner according to at least one embodiment of the present invention comprises: a nozzle; and a swirl vane having a fuel injection hole for injecting a fuel, the swirl vane being disposed in an air flow passage of an annular shape extending along an axial direction of the nozzle around the nozzle and configured to swirl air which flows through the air flow passage; and a partition plate having an annular shape and partitioning at least a region of the air flow passage in a radial direction of the nozzle, the region being downstream of the swirl vane, so as to divide at least the region of the air flow passage into an inner flow passage facing an outer peripheral surface of the nozzle and an outer flow passage disposed on an outer side of the inner flow passage with respect to the radial direction. The fuel injection hole is disposed in the outer flow passage of the air flow passage. An end portion on an upstream side of the partition plate is disposed upstream of the fuel injection hole in the axial direction.

In the above combustion burner, the partition plate divides at least a downstream region of the air flow passage into the inner flow passage and the outer flow passage, and thereby air flowing through the inner flow passage forms a film air layer that covers the outer peripheral surface of the nozzle. Furthermore, the fuel injection hole formed inside the outer flow passage is disposed upstream of the partition plate, and thereby it is possible to prevent entry of fuel injected from the fuel injection hole into the film air layer in the inner flow passage, and thus to suppress occurrence of flashback effectively.

In some embodiments, a swirling direction of the air in the inner flow passage is the same as a swirling direction of the air in the outer flow passage.

According to the above embodiment, air in the inner flow passage downstream of the partition plate and air in the outer flow passage merge in a region where the directions of the air are the same, and thereby the air having passed through the outer flow passage and containing fuel is less likely to mix with the air having passed through the inner flow passage. Accordingly, it is possible to reduce the fuel density in a region where the axial velocity is small due to an influence from a boundary layer formed in the vicinity of the inner wall surface of the partition plate (a region downstream of the partition plate), and thereby it is possible to suppress a backward flow of flames to the region.

In some embodiments, a flow of the air in the inner flow passage is a flow along the axial direction, or a flow having a swirl component in a direction opposite to a swirling direction of the air in the outer flow passage.

According to the above embodiment, a swirl of air passing through the inner flow passage downstream of the partition plate is weakened, and thereby it is possible to increase the axial velocity of air downstream of the inner flow passage. Thus, it is possible to suppress a backward flow (swirl-core flashback) of flames to the rear end surface of the nozzle.

In some embodiments, the nozzle comprises: a nozzle inner flow passage disposed inside the nozzle and in communication with the inner flow passage; and an air injection hole having an opening on a downstream end surface of the nozzle, and being configured to inject the air from the nozzle inner flow passage.

Accordingly, a part of air flowing through the inner flow passage is injected to the downstream side of the nozzle through the air injection hole via the nozzle inner flow passage, and thereby the end surface on the downstream side of the nozzle is covered with air so as to form a region with a low fuel density. As a result, flames are less likely to flow backward to the end surface on the downstream side of the nozzle, which makes it possible to prevent burn damage to the nozzle.

In some embodiments, the outer peripheral surface of the nozzle is along the axial direction at a downstream end portion of the nozzle. The partition plate extends along the axial direction so as to cover the outer peripheral surface at the downstream end portion of the nozzle.

For instance, if the outer peripheral surface of the nozzle does not extend along the axial direction but is tapered, the axial velocity of an air flow passing through the inner flow passage may decrease in accordance with an increase in the flow-path cross-sectional area. In this regard, with the above embodiment, the outer peripheral surface of the nozzle is along the axial direction of the nozzle at the end portion on the downstream side of the nozzle, and is covered with the partition plate extending along the axial direction, and thereby air passes through the inner flow passage while the axial velocity of an air flow is maintained to be high. Thus, it is possible to suppress a backward flow of flames toward the region downstream of the inner flow passage.

In some embodiments, a downstream end portion of the partition plate is disposed upstream of a downstream end surface of the nozzle in the axial direction.

In the above embodiment, the downstream end portion of the nozzle is not covered with the partition plate, and thus a flow of air having passed through the inner flow passage curls up to form a swirl at the downstream side of the partition plate. This swirl reduces the fuel density at the downstream side of the partition plate, and thereby it is possible to suppress a backward flow of flames toward the downstream end portion of the partition plate.

In an embodiment, the downstream end portion of the nozzle has an outer peripheral surface inclined from the axial direction so as to extend away from a center axis of the nozzle in the radial direction, with a distance toward the downstream end surface of the nozzle, at a downstream side of the downstream end portion of the partition plate.

Accordingly, at the downstream end portion of the nozzle, an air flow having passed through the inner flow passage is pressed against the outer peripheral surface of the nozzle, and the boundary layer in the vicinity of the outer peripheral surface of the nozzle becomes thinner. Thus, it is possible to bring the distribution of axial velocity in the vicinity of the outer peripheral surface of the nozzle closer to uniform, which makes it possible to suppress flashback.

In some embodiments, the combustion burner further comprises a plurality of support members disposed in a circumferential direction of the nozzle inside the inner flow passage, and configured to support the partition plate on the nozzle.

Accordingly, the partition plate can be firmly supported on the nozzle.

In an embodiment, the support members are configured to swirl the air passing through the inner flow passage.

Accordingly, the support members are configured to form a swirl flow without interfering with a flow of air in the inner flow passage, and thus it is possible to make use of the support members not only to support the partition plate but also in terms of formation of a swirl flow.

In some embodiments, the swirl vane comprises a plurality of swirl vanes disposed in a circumferential direction of the nozzle. Each of the swirl vanes extends from the outer peripheral surface of the nozzle outward in the radial direction. At least a part of the partition plate extends in the circumferential direction between a pressure surface of one of a pair of swirl vanes disposed adjacent to each other in the circumferential direction, and a suction surface of the other one of the pair of swirl vanes. The inner flow passage includes an inter-blade flow passage surrounded by the partition plate, the outer peripheral surface of the nozzle, the pressure surface, and the suction surface.

Accordingly, even in a case where the swirl vanes are disposed so as to extend from the outer peripheral surface of the nozzle outward in the radial direction, it is possible to form the inter-blade flow passage separated from the outer flow passage with the partition plate, between the adjacent swirl vanes. Thus, it is possible to prevent entry of fuel injected from the fuel injection hole disposed inside the outer flow passage into the inter-blade flow passage.

A combustor according to at least one embodiment of the present invention comprises: the combustion burner according to any one of the above embodiments; a combustion liner for forming a flow channel for guiding combustion gas from the combustion burner.

The above combustor includes a combustion burner whereby it is possible to suppress occurrence of flashback effectively, and thus it is possible to improve the durability of the combustor.

A gas turbine according to at least one embodiment of the present invention comprises: a compressor for generating compressed air; the combustor according to the above embodiment, configured to combust fuel with the compressed air from the compressor to generate combustion gas, and a turbine configured to be driven by the combustion gas from the combustor.

The above combustor includes a combustion burner whereby it is possible to suppress occurrence of flashback effectively, and thus it is possible to improve the durability of the combustor of the gas turbine.

Advantageous Effects

According to at least one embodiment of the present invention, it is possible to prevent entry of fuel injected from the fuel injection hole of the swirl vane into the inner flow passage of the air flow passage, and to suppress occurrence of flashback effectively.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
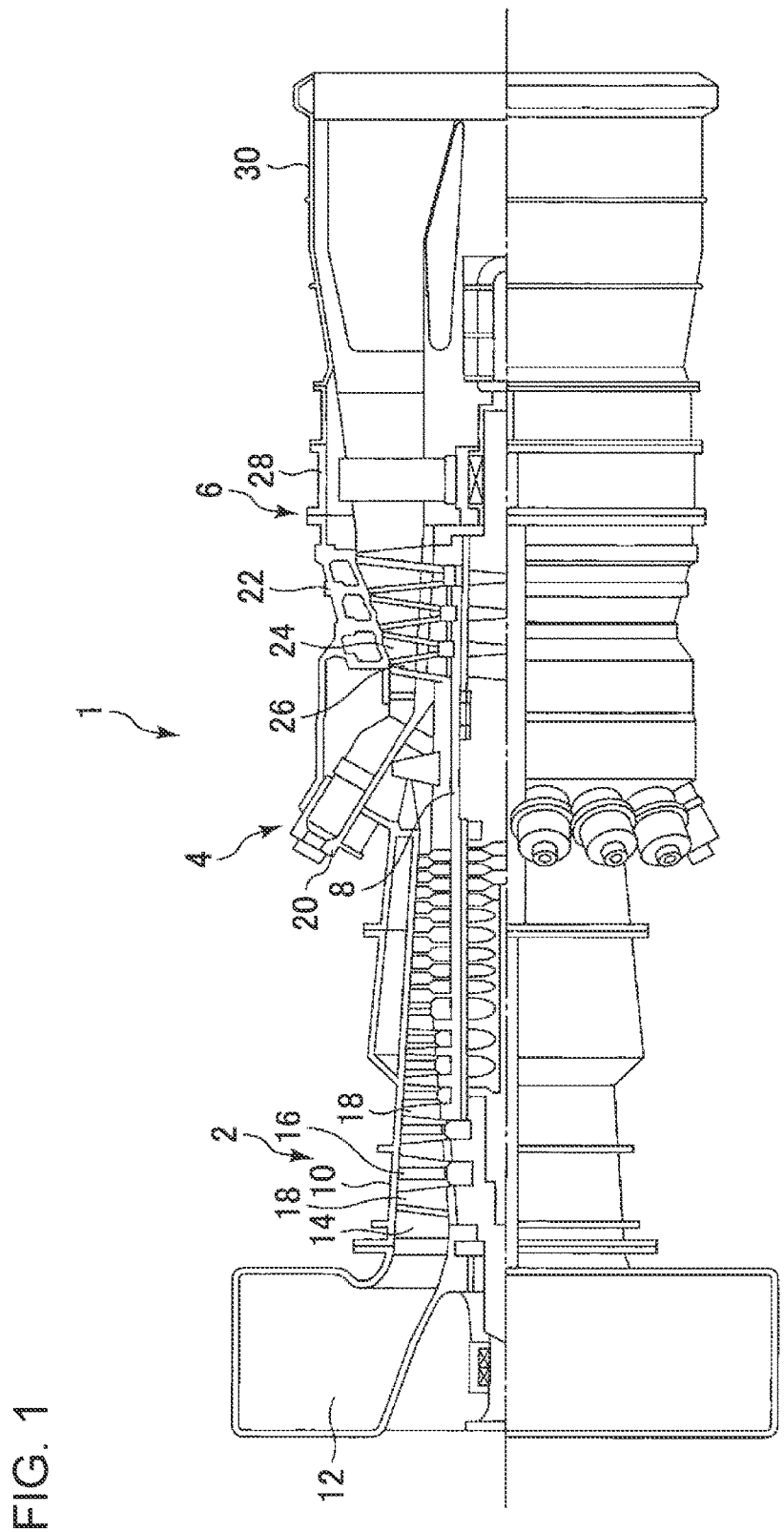
FIG. 1 is a schematic configuration diagram of a gas turbine according to an embodiment.

First, with reference to FIG. 1, a gas turbine 1, an example of application of a combustion burner and a combustor according to the present invention, will be described. FIG. 1 is a schematic configuration diagram of a gas turbine 1 according to an embodiment.

As illustrated in FIG. 1, the gas turbine 1 according to an embodiment includes a compressor 2 for producing compressed air that serves as an oxidant, a combustor 4 for producing combustion gas from the compressed air and fuel, and a turbine 6 configured to be driven by combustion gas to rotate. If the gas turbine 1 is for power generation, a generator (not illustrated) is connected to the turbine 6, so that rotational energy of the turbine 6 generates electric power.

The configuration example of each component in the gas turbine 1 will be described in detail.

The compressor 2 includes a compressor casing 10, an air inlet 12 for sucking in air, disposed on an inlet side of the compressor casing 10, a rotor 8 disposed so as to penetrate through both of the compressor casing 10 and a turbine casing 22 described below, and a variety of vanes disposed in the compressor casing 10. The variety of vanes includes an inlet guide vane 14 disposed adjacent to the air inlet 12, a plurality of stator vanes 16 fixed to the compressor casing 10, and a plurality of rotor vanes 18 implanted on the rotor 8 so as to be arranged alternately with the stator vanes 16. The compressor 2 may include other constituent elements not illustrated in the drawings, such as an extraction chamber. In the above compressor 2, the air sucked in from the air inlet 12 flows through the plurality of stator vanes 16 and the plurality of rotor vanes 18 to be compressed, thereby turning into compressed air having a high temperature and a high pressure. The compressed air having a high temperature and a high pressure is sent to the combustor 4 of a latter stage from the compressor 2.

The combustor 4 is disposed in a casing 20. As illustrated in FIG. 1, a plurality of combustors 4 may be disposed in annular shape centered at the rotor 8 inside the casing 20. The combustor 4 is supplied with fuel and the compressed air produced in the compressor 2, and combusts the fuel to produce combustion gas that serves as a working fluid of the turbine 6. The combustion gas is sent to the turbine 6 of the latter stage from the combustor 4. The configuration example of the combustor 4 will be described later in detail.

The turbine 6 includes a turbine casing 22 and a variety of vanes disposed inside the turbine casing 22. The variety of vanes includes a plurality of stator vanes 24 fixed to the turbine casing 22 and a plurality of rotor vanes 26 implanted on the rotor 8 so as to be arranged alternately with the stator vanes 24. The turbine 6 may include other constituent elements, such as outlet guide vanes. In the turbine 6, the rotor 8 is driven to rotate as the combustion gas passes through the plurality of stator vanes 24 and the plurality of rotor vanes 26. In this way, the generator connected to the rotor 8 is driven.

An exhaust chamber 30 is connected to the downstream side of the turbine casing 22 via an exhaust casing 28. The combustion gas having driven the turbine 6 passes through the exhaust casing 28 and the exhaust chamber 30 before being discharged outside.

Figure 2:
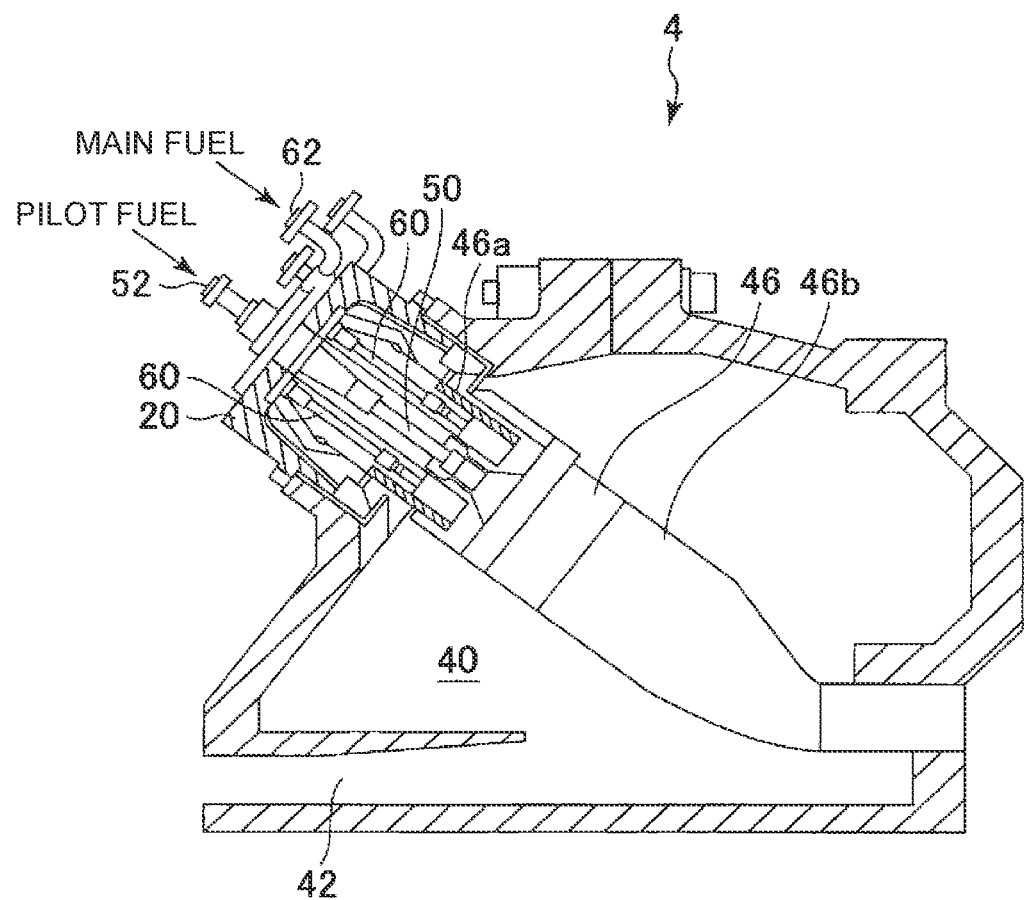
FIG. 2 is a cross-sectional view of a combustor according to an embodiment.
Figure 3:
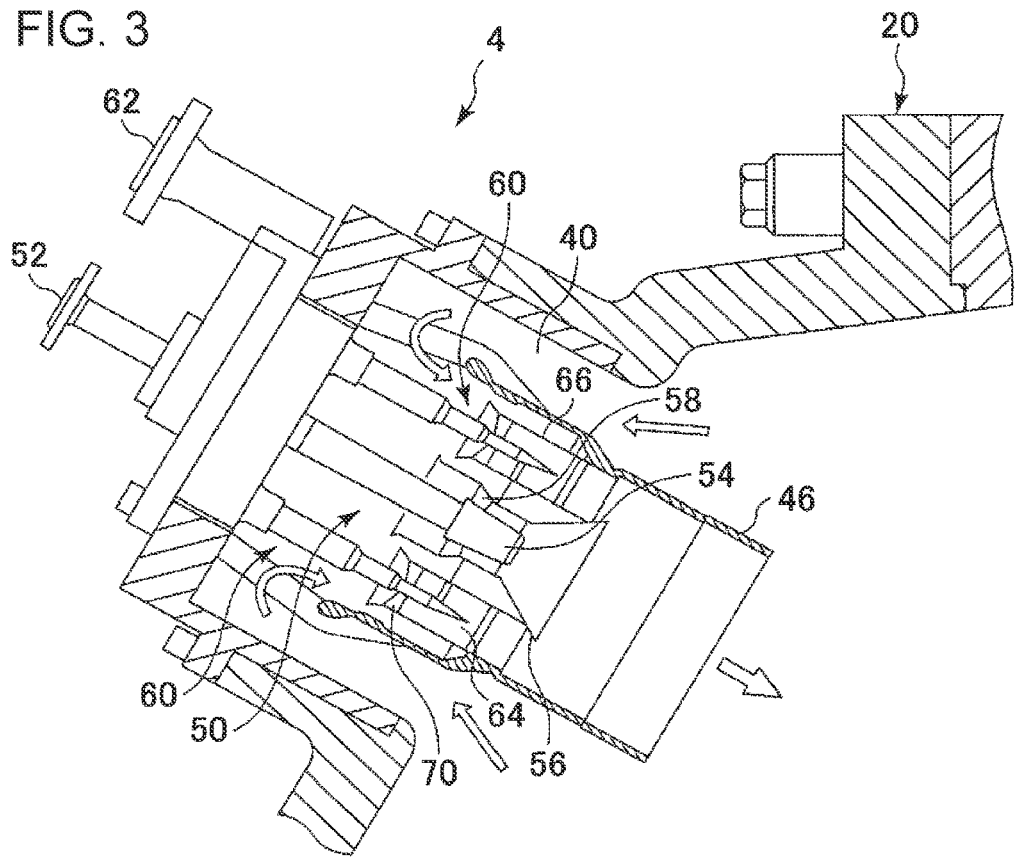
FIG. 3 is a cross-sectional view of a part of a combustor according to an embodiment.

Next, with reference to FIGS. 2 and 3, the specific configuration of the combustor 4 according to an embodiment will be described. FIG. 2 is a cross-sectional view of a combustor 4 according to an embodiment. FIG. 3 is a cross-sectional view of a part of the combustor 4 according to an embodiment.

As depicted in FIGS. 2 and 3, a plurality of combustors 4 according to an embodiment is disposed in annular shape centered at the rotor 8 (see FIG. 1). Each combustor 4 includes a combustion liner 46 disposed in a combustor casing 40 defined by the casing 20, a pilot combustion burner 50 disposed in the combustion liner 46, and a plurality of main combustion burners (premixing combustion burners) 60 disposed in the combustion liner 46. The combustor 4 may include other constituent elements such as a bypass line (not depicted) for allowing the combustion gas to bypass.

For instance, the combustion liner 46 includes a combustor basket 46a disposed around the pilot combustion burner 50 and the plurality of main combustion burners 60, and a transition piece 46b connected to a tip end of the combustor basket 46a.

The pilot combustion burner 50 is disposed along the center axis of the combustion liner 46. The plurality of main combustion burners 60 are arranged at a distance from one another so as to surround the pilot combustion burner 50.

The pilot combustion burner 50 includes a pilot nozzle (nozzle) 54 connected to a fuel port 52, a pilot burner cylinder 56 disposed so as to surround the pilot nozzle 54, and a swirler 58 disposed on the outer circumference of the pilot nozzle 54. The specific configuration of the pilot combustion burner 50 will be described later.

The main combustion burner 60 includes a main nozzle (nozzle) 64 connected to a fuel port 62, a main burner cylinder 66 disposed so as to surround the main nozzle 64, and a swirler 68 disposed on the outer circumference of the main nozzle 64.

In the combustor 4 having the above configuration, the compressed air having a high temperature and a high pressure produced in the compressor 2 is supplied into the combustor casing 40 through a casing inlet 42, and then flows into the main burner cylinder 66 from the combustor casing 40. The compressed air and fuel supplied from the fuel port 62 are premixed in the main burner cylinder 66. At this time, the premixed gas is mainly formed into a swirl flow by the swirler 68, and flows into the combustion liner 46. Further, the compressed air and fuel injected from the pilot combustion burner 50 via the fuel port 52 are mixed in the combustion liner 46, and ignited by a pilot light (not depicted) to be combusted, whereby combustion gas is generated. At this time, a part of the combustion gas diffuses to the surroundings with flames, which ignites the premixed gas flowing into the combustion liner 46 from each of the main combustion burners 60 to cause combustion. Specifically, the pilot flames produced by the pilot fuel injected from the pilot combustion burner 50 can secure flames for performing stable combustion of premixed gas (premixed fuel) from the main combustion burners 60.

Now, the configuration of the combustion burner according to the present embodiment will be described in detail referring to the above described pilot combustion burner 50 as an example.

The combustion burner according to the present embodiment is not limited to the pilot combustion burner 50, and can be applied to a combustion burner of any type as long as the combustion burner includes a swirler (swirl vane) in an axial flow path around a nozzle. For instance, the combustion burner may be the main combustion burner 60 disposed in the combustor 4 of the gas turbine 1, or may be a combustion burner disposed in a device other than the gas turbine 1.

Figure 4:
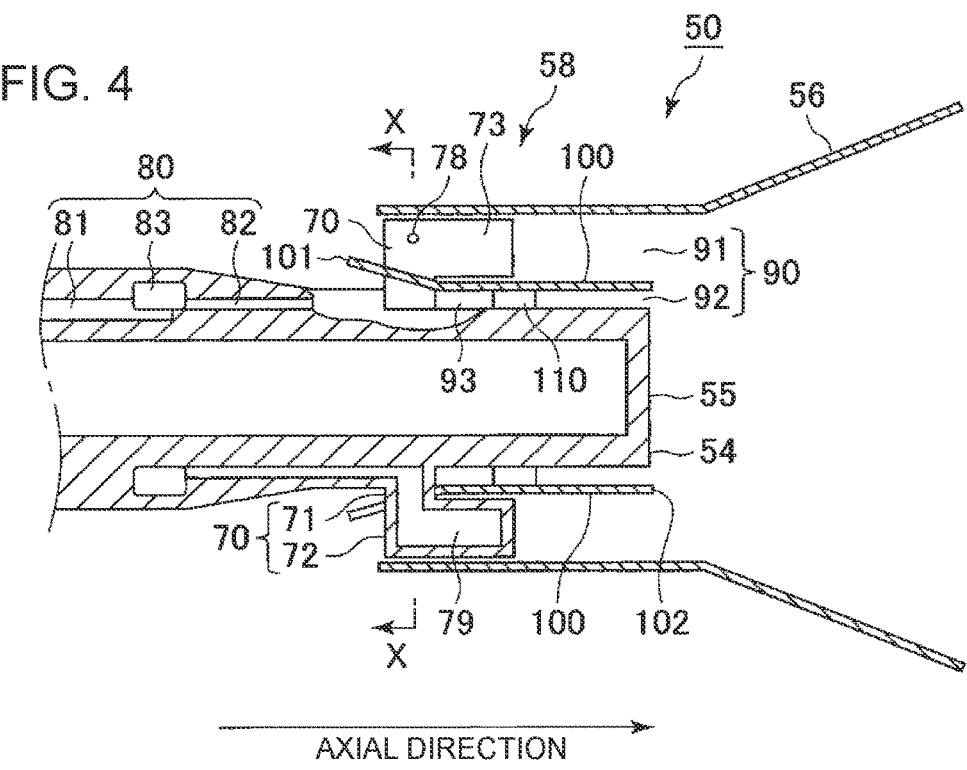
FIG. 4 is a cross-sectional view of a schematic basic configuration of a combustion burner according to some embodiment.
Figure 5:
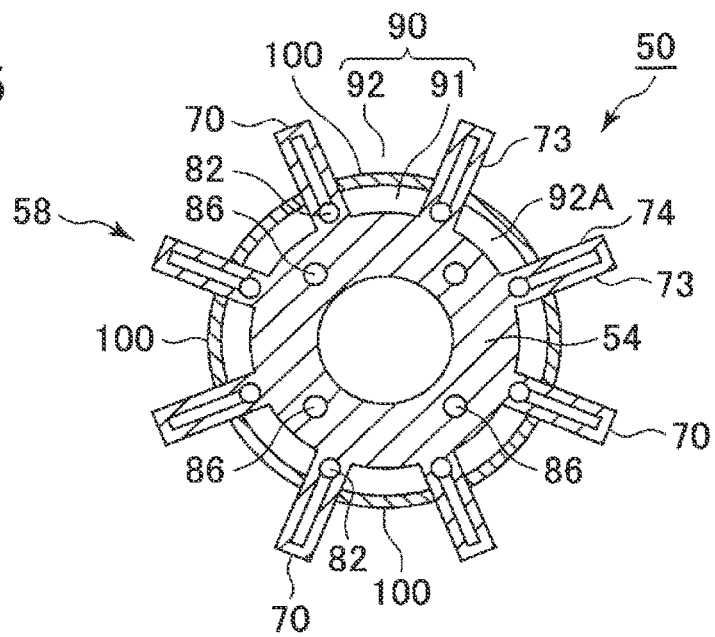
FIG. 5 is a cross-sectional view of the combustion burner depicted in FIG. 4, taken along line X-X.

FIGS. 4 and 5 illustrate the schematic basic configuration of the combustion burner (pilot combustion burner) 50 according to an embodiment. FIG. 4 is a cross-sectional view of an overall basic configuration of the combustion burner 50 according to some embodiments. The drawing is a cross-sectional view taken along the axial direction of the nozzle 54. In FIG. 4, to help understanding, the swirler 58 disposed below the nozzle 54 is depicted in a cross-sectional view taken along the nozzle axial direction, while the swirl vane 70 disposed above the nozzle 54 is depicted in a side view. FIG. 5 is a cross-sectional view of the combustion burner depicted in FIG. 4, taken along line X-X.

The combustion burner 50 according to an embodiment includes the nozzle (fuel nozzle) 54, the pilot burner cylinder 56, the swirler 58, and the partition plate 100.

The nozzle 54 is connected to the fuel port 52 (see FIGS. 2 and 3) as described above, and fuel is supplied from the fuel port 52. The fuel may be gas or liquid, and the type of the fuel is not particularly limited. Furthermore, the pilot nozzle 54 may be supplied with two or more kinds of fuel, such as fuel gas and fuel oil.

The pilot burner cylinder 56 is disposed concentrically with the nozzle 54 so as to surround at least a tip side of the nozzle 54. Specifically, the axis of the pilot burner cylinder 56 substantially coincides with the axis of the nozzle 54, and the diameter of the pilot burner cylinder 56 is larger than the diameter of the nozzle 54. The pilot burner cylinder 56 may have a wall surface formed into a cylindrical shape along the axial direction of the nozzle 54 in an upstream region around the nozzle 54, and a wall surface formed into a circular truncated cone shape whose diameter increases toward an end portion in a downstream region disposed on the side of the flame surface. In the present embodiment, the upstream side is the upstream side with respect the flowing direction of air or fuel, and the downstream side is the downstream side with respect to the flowing direction of air or fuel.

An air flow passage 90 of an annular shape is formed along the axial direction of the nozzle 54 around the nozzle 54, between the outer peripheral surface of the nozzle 54 and the inner peripheral surface of the pilot burner cylinder 56. Air flows through the air flow passage 90 from the upstream side (left side in FIG. 4) toward the downstream side (right side in FIG. 4). Air may be compressed air. Furthermore, the air supplied to the air flow passage 90 may be air not containing fuel.

The swirler 58 is configured to swirl gas flowing through the air flow passage 90, and includes at least one swirl vane 70. In the example depicted in FIGS. 4 and 5, the swirler 58 includes eight swirl vanes 70 disposed in a radial fashion from the nozzle 54 at the center.

The swirl vanes 70 are disposed in the air flow passage 90 extending along the axial direction of the nozzle 54 around the nozzle 54, and configured to apply a swirl force to the gas flowing through the air flow passage 90. The swirl vanes 70 may have a streamline shape which has an airfoil shape in a planar view.

The swirl vanes 70 each have a blade root section 71 disposed on the side of the nozzle 54, and a blade body section 72 disposed on the outer side of the blade root section 71 in the radial direction. Specifically, the blade root section 71 is erected on the outer peripheral surface of the swirl vane 70, and the blade body section 72 is coupled to the nozzle 54 via the blade root section 71. Furthermore, the blade root section 71 has a length shorter than that of the blade body section 72 in the axial direction of the nozzle 54.

Figure 9:
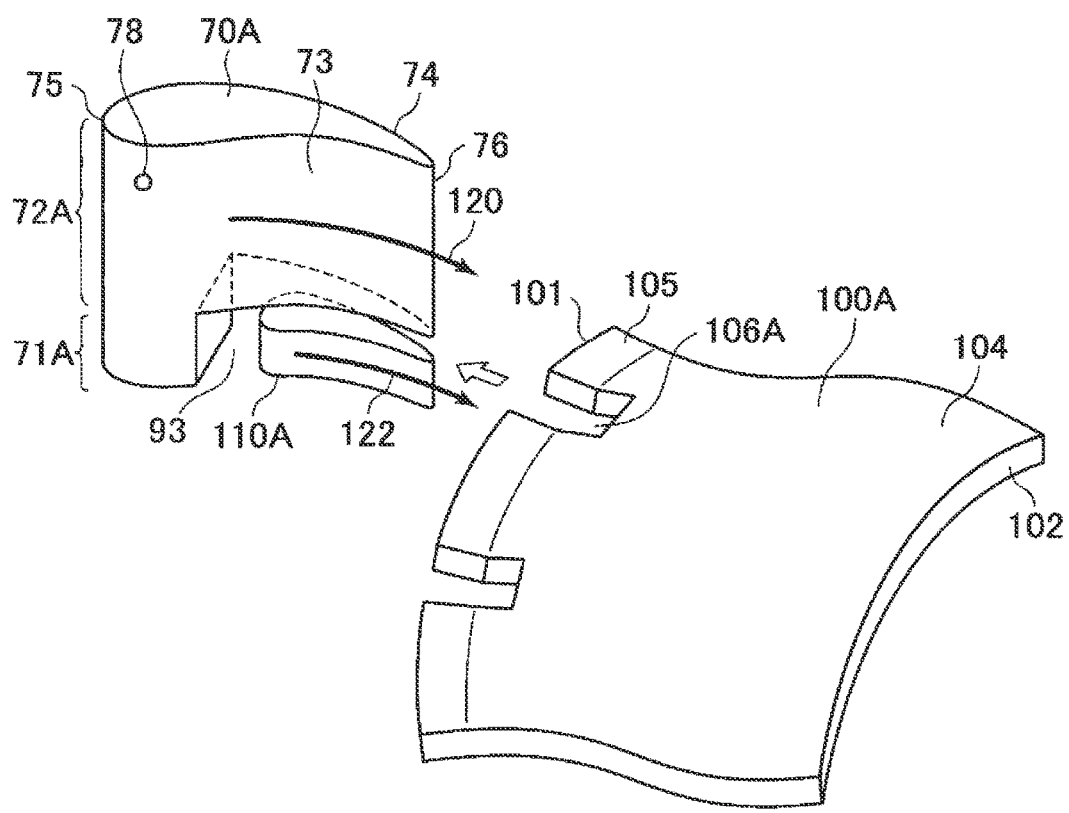
FIG. 9 is an exploded perspective view of a swirl vane and a partition plate according to an embodiment.

Furthermore, as depicted in FIG. 9, each swirl vane 70 has a pressure surface 73, a suction surface 74, a leading edge 75 being an upstream edge portion in the flow direction of gas (the axial direction of the nozzle 54), and a trailing edge 76 being a downstream edge portion in the flow direction. FIG. 9, which will be described in more detail later, is an exploded perspective view of a swirl vane 70A and a partition plate 100A according to an embodiment.

Referring again to FIGS. 4 and 5, the swirl vanes 70 have at least one fuel injection hole 78 formed thereon. In the present embodiment, as an example, one fuel injection hole 78 is formed on the pressure surface 73 of each swirl vane 70. In another configuration, a plurality of fuel injection holes 78 may be formed on the pressure surface 73 or the suction surface 74 (see FIG. 9) of the swirl vane 70. To promote premixing of fuel and air, the at least one fuel injection hole 78 may be disposed in an upstream region of the swirl vane 70.

A fuel flow passage for feeding fuel supplied from the fuel port 52 (see FIGS. 2 and 3) is formed inside the nozzle 54 and the swirl vane 70.

In a configuration example, the fuel flow passage includes a premix-combustion fuel flow passage 80, a diffusive-combustion fuel flow passage 85 (see FIGS. 5 and 6), and an in-swirler fuel flow passage 79.

The premix-combustion fuel flow passage 80 is disposed inside the nozzle 54, and includes an upstream flow passage 81 and a downstream flow passage 82 along the axial direction of the nozzle 54, and a cavity 83 disposed between the upstream flow passage 81 and the downstream flow passage 82. The downstream flow passage 82 is in communication with the in-swirler fuel flow passage 79.

The in-swirler fuel flow passage 79 is disposed inside the swirl vane 70 (e.g. inside the blade root section 71), and is in communication with the fuel injection hole 78 of the swirl vane 70.

A fuel supplied to the premix-combustion fuel flow passage 80 passes through the upstream flow passage 81, the cavity 83, and the downstream flow passage 82 in this order, before being injected into the air flow passage 90 through the fuel injection hole 78 of the swirl vane 70. Fuel injected from the fuel injection hole 78 is mixed with air flowing through the air flow passage 90 to turn into premixed gas (fuel gas), and is sent to a combustion space to be combusted. Herein, a combustion space is a region downstream the nozzle 54, and includes a space surrounded by the pilot burner cylinder 56.

Figure 6:
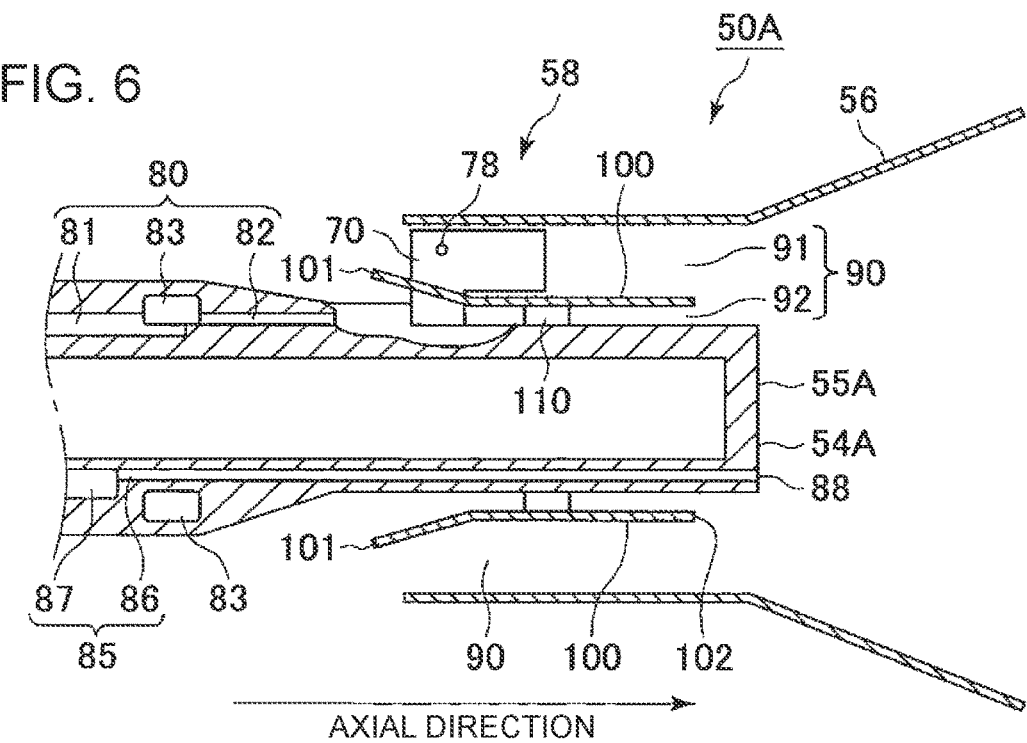
FIG. 6 is a cross-sectional view of a combustion burner according to an embodiment, taken along a nozzle axial direction of the combustion burner.

As depicted in FIG. 6, the diffusive-combustion fuel flow passage 85 is disposed inside the nozzle 54 along the axial direction of the nozzle 54, and includes an in-nozzle fuel flow passage 86 and a cavity 87 in communication with the in-nozzle fuel flow passage 86. The in-nozzle fuel flow passage 86 is in communication with a fuel injection hole 88 formed on the downstream end portion of the nozzle 54. Since the diffusive-combustion fuel flow passage 85 is not depicted in FIG. 4, FIG. 6 shows another cross section including the diffusive-combustion fuel flow passage 85 below the nozzle. Alternatively, in another configuration example, the diffusive-combustion fuel flow passage 85 may be disposed in the center of the nozzle 54.

A fuel supplied to the diffusive-combustion fuel flow passage 85 passes through the cavity 87 and the in-nozzle fuel flow passage 86, before being injected into the combustion space from the fuel injection hole 88. The fuel injected from the fuel injection hole 88 is mixed with air or premixed gas in the combustion space to be combusted.

Referring again to FIGS. 4 and 5, a partition plate 100 is formed into an annular shape so as to surround the nozzle 54. For instance, the partition plate 100 may be formed into an annular shape by joining a plurality of members by welding or the like, or may be formed into an annular shape by a single member.

Furthermore, the partition plate 100 is configured to partition at least a region downstream the swirl vane 70 in the air flow passage 90 in the radial direction of the nozzle 54, thus dividing at least the region in the air flow passage 90 into an inner flow passage 92 facing the outer peripheral surface of the nozzle 54 and an outer flow passage 91 disposed on the outer side of the inner flow passage 92 with respect to the radial direction.

The fuel injection hole 78 formed on the swirl vane 70 is positioned in the outer flow passage 91. Furthermore, an upstream end portion 101 of the partition plate 100 is disposed upstream of the fuel injection hole 78 in the axial direction of the nozzle 54.

In an embodiment, as depicted in FIG. 4, there is no fuel injection hole positioned inside the inner flow passage 92. Specifically, inside the inner flow passage 92, no fuel injection hole is disposed on the outer peripheral surface nor on the swirl vane 70 in the nozzle 54. Furthermore, in an embodiment, the air supplied to the air flow passage 90 is air not containing fuel.

In the example depicted in FIG. 4, the partition plate 100 is configured to partition the entire region from the upstream side to the downstream side of the swirl vane 70.

Alternatively, the upstream end portion 101 of the partition plate 100 may be disposed downstream of a leading edge 75 (see FIG. 9) of the swirl vane 70. Also in this case, the upstream end portion 101 of the partition plate 100 is disposed upstream of the fuel injection hole 78 in the axial direction of the nozzle 54.

According to the above embodiment, the partition plate 100 divides at least a downstream region of the air flow passage 90 into the inner flow passage 92 and the outer flow passage 91, and thereby air flowing through the inner flow passage 92 forms a film air layer that covers the outer peripheral surface of the nozzle 54. Furthermore, the fuel injection hole 78 formed inside the outer flow passage 91 is disposed upstream of the partition plate 100, and thereby it is possible to prevent entry of fuel injected from the fuel injection hole 78 into the film air layer in the inner flow passage 92, and thus to suppress occurrence of flashback effectively.

Furthermore, the combustion burner 50 according to the present embodiment may selectively include the following configuration.

In some embodiments, the combustion burner 50 includes a plurality of fuel injecting parts for injecting fuel into the air flow passage 90, and the fuel injection part disposed most upstream of the plurality of fuel injection parts is the fuel injection hole 78 of the swirl vane 70. In other words, the fuel injection parts may include a fuel injection part other than the fuel injection hole 78 of the swirl vane 70, for instance, a fuel injection hole 88 depicted in FIG. 6. However, the other fuel injection part is disposed downstream of the fuel injection hole 78 of the swirl vane 70. Furthermore, while a fuel injection part may be disposed within a range, in the axial direction, in which the partition plate 100 is disposed, such a fuel injection part is configured to inject fuel into only the outer flow passage 91 (i.e., the fuel injection part does not inject fuel into the inner flow passage 92).

In an embodiment, as depicted in FIG. 5, the partition plate 100 at least partially extends in the circumferential direction, between the pressure surface 73 of one of a pair of swirl vanes 70 disposed adjacent to each other in the circumferential direction, and the suction surface 74 of the other one of the pair of swirl vanes 70. With this configuration, the inner flow passage 92 has an inter-blade flow passage 92A surrounded by the partition plate 100, the outer peripheral surface of the nozzle 54, the pressure surface 73 and the suction surface 74 of the swirl vanes 70. The inter-blade flow passage 92A is at least a part of the inner flow passage 92.

With the above configuration, even in a case where the swirl vanes 70 are disposed so as to extend from the outer peripheral surface of the nozzle 54 outward in the radial direction, it is possible to form the inter-blade flow passage 92A separated from the outer flow passage 91 with the partition plate 100, between the adjacent swirl vanes 70. Accordingly, it is possible to prevent entry of fuel injected from the fuel injection hole 78 disposed inside the outer flow passage 91 into the inter-blade flow passage 92A.

In some embodiments, the outer peripheral surface of the nozzle 54 is along the axial direction of the nozzle 54, at the downstream end portion 55 of the nozzle 54 (in fact, in a nozzle downstream region including the downstream end portion 55). In other words, the outer peripheral surface of the nozzle 54 in the downstream region of the nozzle 54 is formed into a cylindrical shape having a diameter that is substantially constant in the axial direction. Furthermore, the partition plate 100 extends along the axial direction so as to cover the outer peripheral surface at the downstream end portion of the nozzle 54. The partition plate 100 is also formed into a cylindrical shape having a diameter that is substantially constant in the axial direction, in the downstream region of the nozzle 54. With this configuration, the distance between the outer peripheral surface of the nozzle 54 and the inner peripheral surface of the partition plate 100 is substantially constant in the axial direction of the nozzle 54. Furthermore, in the example depicted in FIG. 4, the downstream end portion 102 of the partition plate 100 and the downstream end portion 55 of the nozzle 54 are at the same position in the axial direction. Nevertheless, the relationship between the positions in the axial direction of the downstream end portion 102 of the partition plate 100 and the downstream end portion 55 of the nozzle 54 is not limited to the above configuration.

For instance, if the outer peripheral surface of the nozzle 54 does not extend along the axial direction but is tapered, the axial velocity of an air flow passing through the inner flow passage 92 may decrease in accordance with an increase in the flow-path cross-sectional area. In this regard, with the above embodiment, the outer peripheral surface of the nozzle 54 is along the axial direction of the nozzle 54 at the downstream end portion of the nozzle 54, and is covered with the partition plate 100 extending along the axial direction, and thereby air passes through the inner flow passage 92 while the axial velocity of an air flow is maintained to be high. Thus, it is possible to suppress a backward flow of flames toward the region downstream of the inner flow passage 92.

Furthermore, as described below, if an air flow inside the inner flow passage 92 has a swirling component, the air flow is pressed against the inner wall surface of the partition plate 100, and the boundary layer formed in the vicinity of the inner wall surface of the partition plate 100 becomes thinner, which leads to an increase in the axial velocity in the vicinity of the inner wall surface of the partition plate 100. Thus, it is possible to suppress a backward flow of flames toward the region downstream of the partition plate 100 in particular.

As depicted in FIG. 4, the combustion burner 50 may further include a plurality of support members 110 disposed in the circumferential direction of the nozzle 54 inside the inner flow passage 92, the support members 110 supporting the partition plate 100 to the nozzle 54. The support members 110 are disposed between the inner peripheral surface of the partition plate 100 and the outer peripheral surface of the nozzle 54. Providing the support members 110 as described above makes it possible to support the partition plate 100 firmly to the nozzle 54.

In an embodiment, each of the support members 110 is disposed downstream of the swirl vanes 70. Accordingly, it is possible to reduce an influence of the support members 110 on an air flow in the inner flow passage 92. Each of the support members 110 may be disposed downstream of the swirl vanes 70 via a gap 93.

Figure 7:
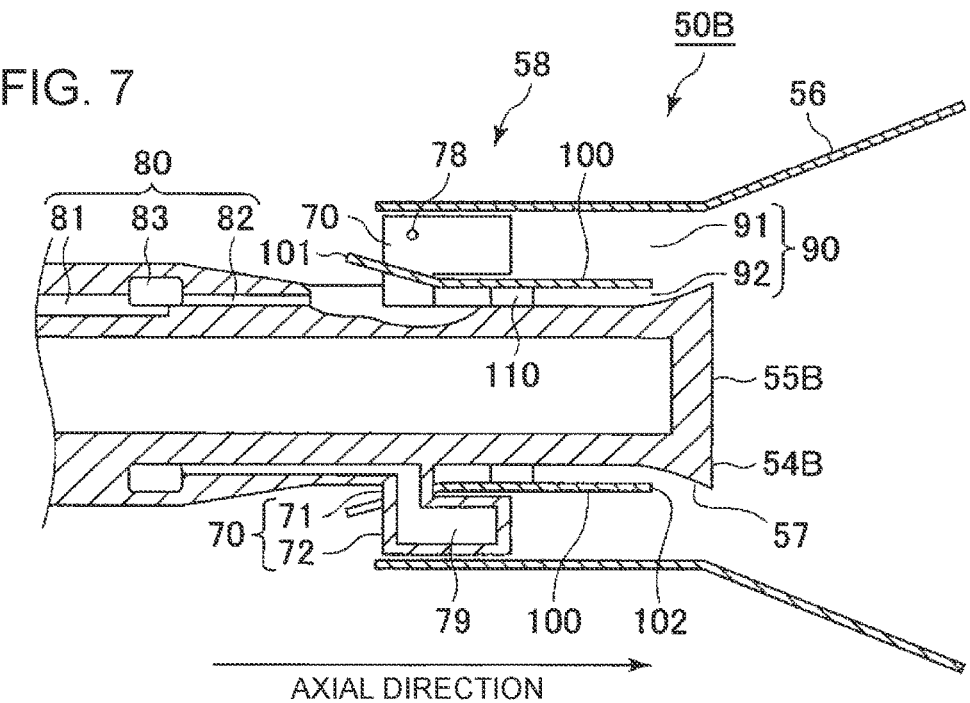
FIG. 7 is a cross-sectional view of a combustion burner according to another embodiment, taken along the nozzle axial direction of the combustion burner.
Figure 8:
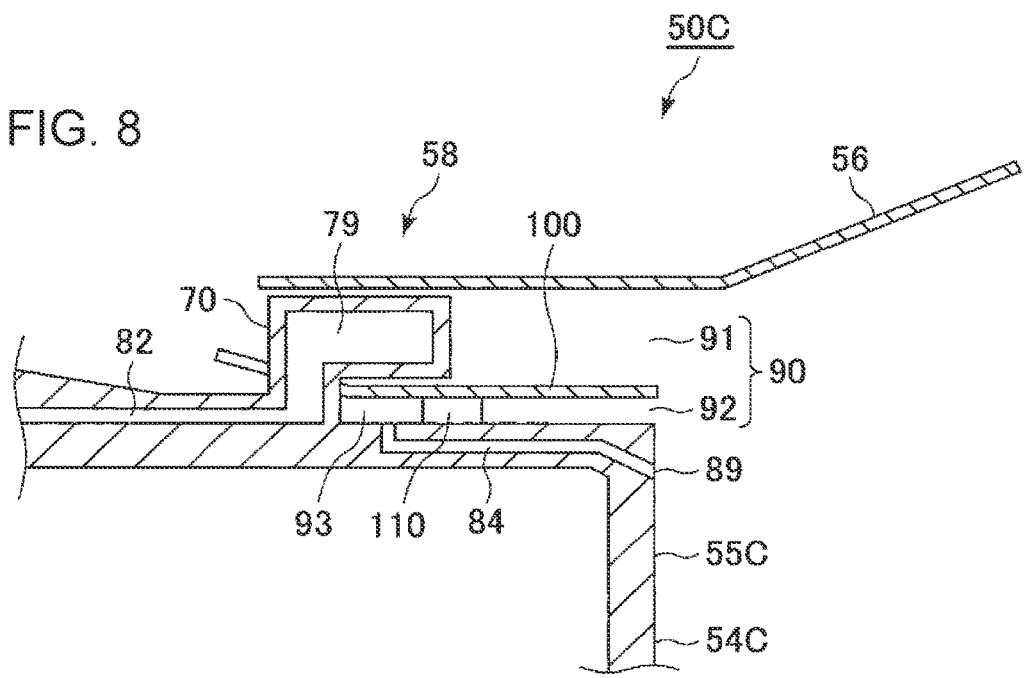
FIG. 8 is a partial cross-sectional view of a combustion burner according to another embodiment, taken along the nozzle axial direction of the combustion burner.

According to some embodiments, the combustion burner 50 may further include the following configuration in addition to the basic configuration described in the above embodiment. FIGS. 6 to 8 mainly show modified examples of the nozzle 54 and the partition plate 100. FIGS. 9 to 11A, 11B mainly show modified examples of the swirl vane 70 and the partition plate 100. In FIGS. 6 to 11A, and 11B, the same component is indicated by the same reference numeral.

FIG. 6 is a cross-sectional view of a combustion burner 50A according to an embodiment, taken along the nozzle axial direction of the combustion burner 50A.

In the combustion burner 50A according to an embodiment, the downstream end portion 102 of the partition plate 100 is disposed upstream of the end surface of the downstream end portion 55A of the nozzle 54A, in the axial direction of the nozzle 54A. In other words, the combustion burner 50A is configured such that the downstream end portion 55A of the nozzle 54A protrudes toward the downstream side from the partition plate 100. Specifically, the downstream end portion 55B is formed into a cylindrical shape having a diameter that is substantially constant in the axial direction, and the protruding portion is also formed into a cylindrical shape.

In this case, the downstream end portion 55A of the nozzle 54A is not covered with the partition plate 100, and thus a flow of air having passed through the inner flow passage 92 curls up to form a swirl at the downstream side of the partition plate 100. This swirl reduces the fuel density at the downstream side of the partition plate 100, and thereby it is possible to suppress a backward flow of flames toward the downstream end portion 102 of the partition plate 100.

FIG. 7 is a cross-sectional view of a combustion burner 50B according to another embodiment, taken along the nozzle axial direction of the combustion burner 50B.

In the combustion burner 50B according to this embodiment, the downstream end portion 102 of the partition plate 100 is disposed upstream of the end surface of the downstream end portion 55B of the nozzle 54B, in the axial direction of the nozzle 54B. In other words, the combustion burner 50B is configured such that the downstream end portion 55B of the nozzle 54B protrudes toward the downstream side from the partition plate 100. Furthermore, the downstream end portion 55B of the nozzle 54B has an inclined surface 57, which is an outer peripheral surface inclined from the axial direction so as to be away from the center axis of the nozzle 54B in the radial direction of the nozzle 54B with a distance toward the downstream end surface of the nozzle 54B, at the downstream side of the downstream end portion 102 of the partition plate 100. In other words, the downstream end portion 55B of the nozzle 54B protrudes downstream from the partition plate 100 and has a diameter that increases toward the downstream side. Herein, the expression "inclined" includes both of linear inclination (the inclined surface 57 is a straight line) and curved inclination with a tangent inclined from the axial direction (the inclined surface 57 is a curve).

With the above embodiment, at the downstream end portion 55B of the nozzle 54B, an air flow having passed through the inner flow passage 92 is pressed against the outer peripheral surface of the nozzle 54B, and the boundary layer in the vicinity of the outer peripheral surface of the nozzle 54B becomes thinner. Thus, it is possible to bring the distribution of axial velocity in the vicinity of the outer peripheral surface of the nozzle 54B closer to uniform, which makes it possible to suppress flashback.

FIG. 8 is a partial cross-sectional view of a combustion burner 50C according to another embodiment, taken along the nozzle axial direction of the combustion burner 50C.

In the combustion burner 50C according to some embodiments, the nozzle 54C further includes a nozzle inner flow passage 84, and an air injection hole 89.

The nozzle inner flow passage 84 is disposed inside the nozzle 54C, and is configured to be in communication with the inner flow passage 92. In the example depicted in FIG. 8, the inlet of the nozzle inner flow passage 84 has an opening into the gap 93 between the nozzle 54C and the support member 110, and the outlet of the nozzle inner flow passage 84 is the air injection hole 89 having an opening on the end surface of the downstream end portion 55C of the nozzle 54C. Air branched from the inner flow passage 92 to flow through the nozzle inner flow passage 84 is injected into the combustion space downstream of the nozzle 54C, through the air injection hole 89. In an embodiment, the upstream side of the nozzle inner flow passage 84 is formed along the axial direction of the nozzle 54C, and the downstream side of the nozzle inner flow passage 84 may be inclined toward the inner side of the nozzle 54C. In this case, air that flows through the nozzle inner flow passage 84 is injected through the air injection hole 89 into the inner side, in the radial direction, of the nozzle 54C.

Accordingly, a part of air flowing through the inner flow passage 92 is injected to the downstream side of the nozzle 54 through the air injection hole 89 via the nozzle inner flow passage 84, and thereby the end surface on the downstream side of the nozzle 54 is covered with air so as to form a region with a low fuel density. As a result, flames are less likely to flow backward to the downstream end surface of the nozzle 54, which makes it possible to prevent burn damage to the nozzle 54.

FIG. 9 is an exploded perspective view of a swirl vane 70A and a partition plate 100A according to an embodiment.

In an embodiment, the swirl vane 70A includes a blade body section 72A and a blade root section 71A. The partition plate 100A includes an upstream end portion 101, a downstream end portion 102, a cylindrical portion 104, an inter-blade portion 105, and a recessed portion 106A.

In this embodiment, a swirling direction 122 of air in the inner flow passage 92 (see FIGS. 4 and 5) of the swirl vane 70A is the same as a swirling direction 120 of air in the outer flow passage 91. In other words, the inner flow passage 92 is also provided with a swirling part, which applies swirl in the same direction as the swirling direction 120 of air in the outer flow passage 91, to air flowing through the inner flow passage.

In a configuration example, the swirling part for swirling air passing through the inner flow passage 92 is the support member 110A for supporting the partition plate 100A to the nozzle 54 (see FIGS. 4 and 5). In this case, the support member 110A may have a streamline shape having an airfoil shape in a planar view, or an inclined plate shape like a louver in a more simplified configuration. The configuration of the support member 110A is not particularly limited. The swirl vane 70A and the support member 110A may be provided as separate members and disposed at a distance from each other. For instance, the support member 110A is disposed downstream of the swirl vane 70A across the gap 93.

According to the above embodiment, air in the inner flow passage 92 (see FIGS. 4 and 5) downstream of the partition plate 100A and air in the outer flow passage 91 merge in a region where the directions 120, 122 of the air are the same, and thereby the air having passed through the outer flow passage 91 and containing fuel is less likely to mix with the air having passed through the inner flow passage 92. Accordingly, it is possible to reduce the fuel density in a region where the axial velocity is small due to an influence from a boundary layer formed in the vicinity of the inner wall surface of the partition plate 100A (a region downstream of the partition plate 100A), and to suppress a backward flow of flames to the region. Furthermore, since the support member 110A is configured to form a swirl flow without interfering with a flow of air in the inner flow passage 92, and thus it is possible to make use of the support member 110A not only to support the partition plate 100A but also t a swirl flow.

Although not depicted, in another embodiment, a flow direction of air in the inner flow passage 92 (see FIGS. 4 and 5) is a flow along the axial direction of the nozzle 54, or a flow having a swirl component in a direction opposite from the swirling direction 120 (see FIG. 9) of air in the outer flow passage 91.

According to the above embodiment, a swirl of air passing through the inner flow passage 92 downstream of the partition plate 100 is weakened, and thereby it is possible to increase the axial velocity of air downstream of the inner flow passage 92. Thus, it is possible to suppress a backward flow (swirl-core flashback) of flames to the rear end surface of the nozzle 54.

Figure 11A:
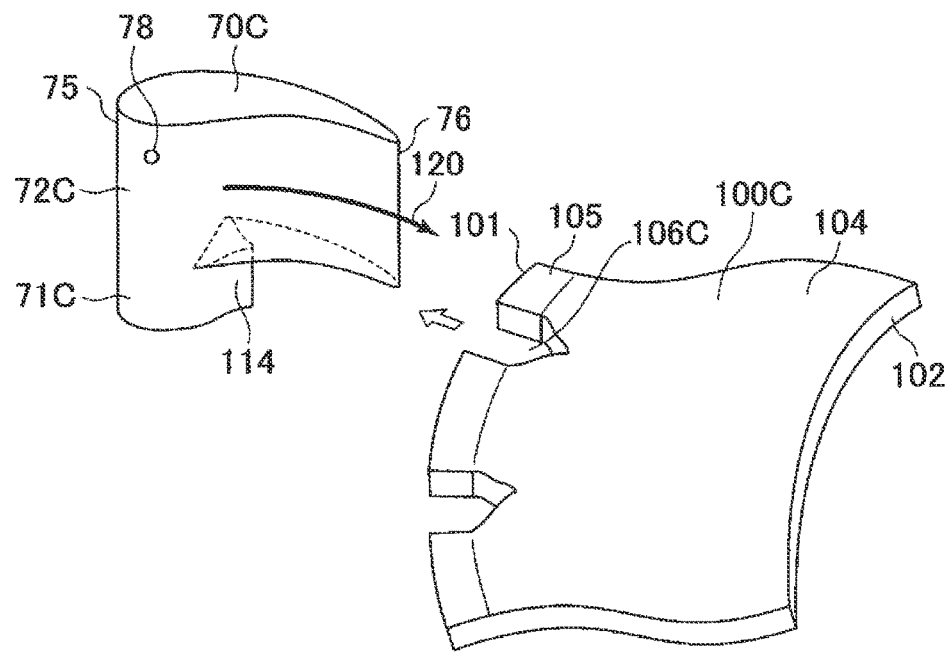
FIG. 11A is an exploded perspective view of a swirl vane and a partition plate according to another embodiment.

In FIG. 11A, the side of the downstream end portion 102 of the partition plate 100A is the cylindrical portion 104 extending continuously in the circumferential direction, and the side of the upstream end portion 101 of the partition plate 100A may have a recessed portion 106A to be engaged with the blade root section 71A of the swirl vane 70A. In a case where a plurality of swirl vanes 70A is disposed in the circumferential direction of the nozzle 54, a plurality of recessed portions 106A is formed on the partition plate 100A, corresponding to the respective swirl vanes 70A. The plurality of recessed portions 106A are formed separate from each other in the circumferential direction of the nozzle 54.

Furthermore, the upstream end portion 101 of the partition plate 100A may have a shape with a diameter increasing toward the upstream side, like a bell-mouth shape, for instance. In the depicted example, the upstream end portion 101 of the partition plate 100A has inter-blade portions 105 intermittently formed by the recessed portions 106A, and the inter-blade portions 105 each have a diameter increasing toward the upstream side in the axial direction.

The partition plate 100A is formed to integrate with the swirl vane 70A. For instance, the partition plate 100A and the swirl vane 70A may be integrated by being joined by welding or the like, or the partition plate 100A and the swirl vane 70A may be integrated by fitting. Alternatively, the partition plate 100A and the swirl vane 70A may be formed as a single member.

In another configuration example (not depicted), the partition plate 100 (see FIGS. 4 and 5) may extend to the upstream side of the leading edge 75 of the swirl vane 70, and may be closed at the upstream side of the leading edge 75 of the swirl vane 70. Specifically, the partition plate 100 may be disposed so as to surround the entire periphery of the swirl vane.

Figure 10:
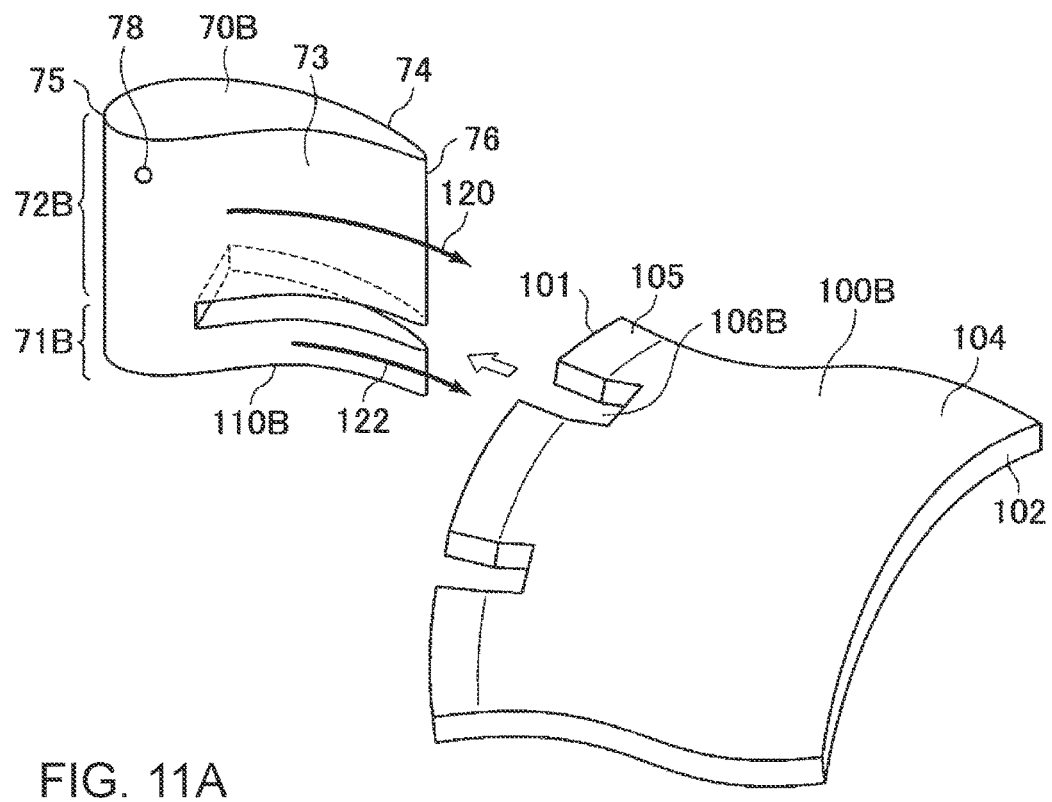
FIG. 10 is an exploded perspective view of a swirl vane and a partition plate according to another embodiment.

FIG. 10 is an exploded perspective view of a swirl vane 70B and a partition plate 100B according to another embodiment. Features different from those in FIG. 9 will be described below.

In this embodiment, the swirl vane 70B includes a blade body section 72B and a blade root section 71B. The partition plate 100B includes an upstream end portion 101, a downstream end portion 102, a cylindrical portion 104, an inter-blade portion 105, and a recessed portion 106B.

In this embodiment, the support member 110B is configured to swirl air flowing through the inner flow passage 92 (see FIGS. 4 and 5) in the direction 120, which is the same direction as that of the air flowing through the outer flow passage 91. The support member 100B is formed to integrate with the swirl vane 70B. In other words, the swirl vane 70B and the support member 110B are coupled to each other at the blade root section 71B. For instance, the support member 110B may be formed integrally with the swirl vane 70B into a single member, or by joining a separate member to the swirl vane 70B by welding or the like.

Figure 11B:
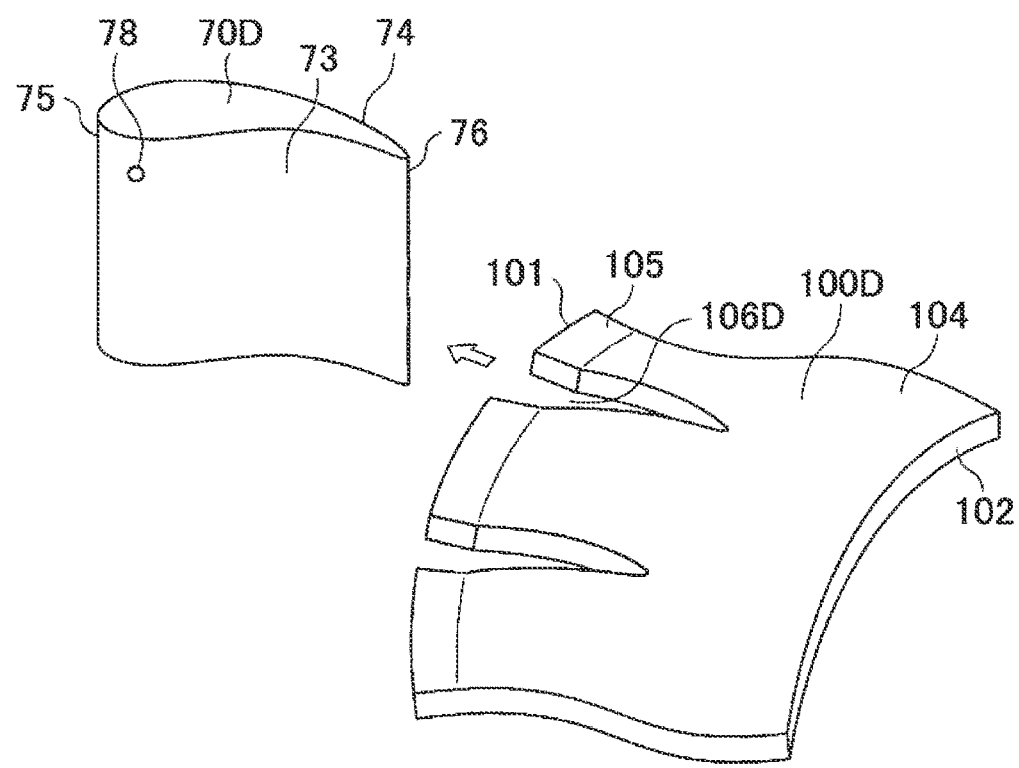
FIG. 11B is an exploded perspective view of a swirl vane and a partition plate according to another embodiment.

FIGS. 11A and 11B are each an exploded perspective view of a swirl vane and a partition plate according to another embodiment.

In the embodiment depicted in FIG. 11A, the swirl vane 70C includes a blade body section 72C and a blade root section 71C. The partition plate 100C includes an upstream end portion 101, a downstream end portion 102, a cylindrical portion 104, an inter-blade portion 105, and a recessed portion 106C.

In this embodiment, although no support member is provided between the partition plate 100C and the nozzle 54 (see FIGS. 4 and 5), a swirling portion 114 is disposed in the inner flow passage 92. The swirling portion 114 has a shape different from that of the blade body section 72C, and is configured to swirl air in the same direction as, or in the opposite direction from, the swirling direction 120 of the outer flow passage 91. The recessed portion 106C disposed on the side of the upstream end portion 101 of the partition plate 100C has a shape engageable with the swirling portion 114 and the blade root section 71C.

In the embodiment depicted in FIG. 11B, the swirl vane 70D includes a blade body section 72D and a blade root section 71D. The partition plate 100D includes an upstream end portion 101, a downstream end portion 102, a cylindrical portion 104, an inter-blade portion 105, and a recessed portion 106D.

In this embodiment, no support member is provided between the partition plate 100D and the nozzle 54 (see FIGS. 4 and 5). Furthermore, the swirl vane 70D has an airfoil shape that is constant in the radial direction of the nozzle 54. The recessed portion 106D disposed on the side of the upstream end portion 101 of the partition plate 100D has a shape engageable with swirl vane 70D.

As described above, according to the embodiments of the present invention, it is possible to prevent entry of fuel injected from the fuel injection hole 78 of the swirl vane 70, 70A to 70D into the inner flow passage 92 of the air flow passage 90, and to suppress occurrence of flashback effectively.

Embodiments of the present invention were described in detail above, but the present invention is not limited thereto, and various amendments and modifications may be implemented.

For instance, in the present embodiment, while the pilot combustion burner 60 is depicted as a combustion burner, the embodiment of the present invention can be also applied to the premix combustion burner 50. Further, while a two-dimensional airfoil is illustrated in the present embodiment, the embodiment of the present invention can be applied to a three-dimensional airfoil For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Gas turbine
2 Compressor
4 Combustor
6 Turbine
10 Compressor casing
22 Turbine casing
28 Exhaust casing
30 Exhaust chamber
40 Combustor casing
46 Combustion liner
50, 50A to 50C Combustion burner (pilot combustion burner)
52 Fuel port
54, 54A to 54C Nozzle (pilot nozzle)
56 Pilot burner cylinder
57 Outer peripheral surface (inclined surface)
58 Swirler
60 Main combustion burner
62 Fuel port
64 Nozzle (main nozzle)
66 Main burner cylinder
70, 70A to 70D Swirl vane
71, 71A to 71D Blade root section
72, 72A to 72D Blade body section
78 Fuel injection hole
79 In-swirler fuel flow passage
84 Nozzle inner flow passage
88 Fuel injection hole
89 Air injection hole
90 Air flow passage
91 Outer flow passage
92 Inner flow passage
92A Inter-blade flow passage
93 Gap
100, 100A to 100D Partition plate
110, 110A to 110B Support member

The invention claimed is:

1. A combustion burner, comprising:
a nozzle;
a swirl vane having a fuel injection hole for injecting a fuel, the swirl vane being disposed in an air flow passage of an annular shape extending along an axial direction of the nozzle around the nozzle and configured to swirl air which flows through the air flow passage; and
a partition plate having an annular shape and partitioning at least a region of the air flow passage in a radial direction of the nozzle, the region being downstream of the swirl vane, so as to divide at least the region of the air flow passage into an inner flow passage facing an outer peripheral surface of the nozzle and an outer flow passage disposed on an outer side of the inner flow passage with respect to the radial direction,
wherein the fuel injection hole is disposed in the outer flow passage of the air flow passage,
wherein an end portion on an upstream side of the partition plate is disposed upstream of the fuel injection hole in the axial direction,
wherein the nozzle comprises:
a nozzle inner flow passage disposed inside the nozzle and in communication with the inner flow passage; and an air injection hole having an opening on a downstream end surface of the nozzle, and being configured to inject the air from the nozzle inner flow passage.

2. The combustion burner according to claim 1, wherein a swirling direction of the air in the inner flow passage is the same as a swirling direction of the air in the outer flow passage.

3. The combustion burner according to claim 1, wherein a flow of the air in the inner flow passage is a flow along the axial direction, or a flow having a swirl component in a direction opposite to a swirling direction of the air in the outer flow passage.

4. The combustion burner according to claim 1, wherein the outer peripheral surface of the nozzle is along the axial direction at a downstream end portion of the nozzle, and wherein the partition plate extends along the axial direction so as to cover the outer peripheral surface at the downstream end portion of the nozzle.

5. The combustion burner according to claim 1, wherein a downstream end portion of the partition plate is disposed upstream of a downstream end surface of the nozzle in the axial direction.

6. The combustion burner according to claim 1, further comprising
a plurality of support members disposed in a circumferential direction of the nozzle inside the inner flow passage, and configured to support the partition plate on the nozzle.

7. The combustion burner according to claim 6, wherein the support members are configured to swirl the air passing through the inner flow passage.

8. The combustion burner according to claim 1,
wherein the swirl vane comprises a plurality of swirl vanes disposed in a circumferential direction of the nozzle,
wherein each of the swirl vanes extends from the outer peripheral surface of the nozzle outward in the radial direction,
wherein at least a part of the partition plate extends in the circumferential direction between a pressure surface of one of a pair of swirl vanes disposed adjacent to each other in the circumferential direction, and a suction surface of other one of the pair of swirl vanes, and
wherein the inner flow passage includes an inter-blade flow passage surrounded by the partition plate, the outer peripheral surface of the nozzle, the pressure surface, and the suction surface.

9. A combustor, comprising: the combustion burner according to claim 1; and
a combustion liner for forming a flow channel for guiding combustion gas from the combustion burner.

10. A gas turbine, comprising:
a compressor for generating compressed air;
the combustor according to claim 9, configured to combust fuel with the compressed air from the compressor to generate combustion gas; and
a turbine configured to be driven by the combustion gas from the combustor.

* * * * *